United States Patent [19]

Wakeley

[11] 4,184,656
[45] Jan. 22, 1980

[54] SEAT TRACK MECHANISM FOR OPERATING STATION OF AIRCRAFT REFUELING BOOM

[75] Inventor: Tendon Wakeley, Bellevue, Wash.

[73] Assignee: The Boeing Company, Seattle, Wash.

[21] Appl. No.: 866,628

[22] Filed: Jan. 3, 1978

[51] Int. Cl.² .................... B64D 11/06; B64D 39/00
[52] U.S. Cl. ............................ 244/118.6; 297/346;
296/65 R; 244/122 R; 244/135 A; 108/140;
108/143; 248/429
[58] Field of Search ............ 244/118 R, 118 P, 117 R,
244/119, 122 R, 129.1, 129.3, 135 R, 135 A;
297/232, 241, 257, 346; 248/424–430; 296/65
R; 35/12 R, 12 B, 12 H, 12 N, 12 W; 350/301,
302, 307; 89/37.5 R; 198/800; 104/48, 63, 64;
108/140, 142, 143; 312/239

[56] References Cited

U.S. PATENT DOCUMENTS

| 307,850 | 11/1884 | Edwards | 108/143 |
| 1,430,465 | 9/1922 | Niemuth | 297/174 X |
| 2,067,585 | 1/1937 | Trimbach | 89/37.5 R |
| 2,412,219 | 12/1946 | Hunter | 312/239 |
| 2,595,992 | 5/1952 | Tapp et al. | 104/63 |
| 2,859,002 | 11/1958 | Leisy | 244/135 A |
| 2,938,434 | 5/1960 | Myren | 89/37.5 R |
| 3,062,358 | 11/1962 | Woodward | 198/800 |
| 3,079,112 | 2/1963 | Campbell et al. | 244/122 R |
| 3,305,264 | 2/1967 | Gunn | 297/346 |
| 3,993,280 | 11/1976 | Surbaugh | 297/346 |

*Primary Examiner*—Galen L. Barefoot
*Attorney, Agent, or Firm*—Hughes & May

[57] ABSTRACT

An operating station having an operator's seat and one or more observer's seats movable along a U-shaped track so as to be positioned either behind or on either side of the operator's seat. The track comprises four individual rails to which is mounted a set of four swivel rollers which support a base member of the observer's seat. The rails each have a substantially identical U-shaped configuration, with the center of symmetry of each U-shaped rail being offset from one another in a manner that the base member of the observer's seat is able to move along the entire U-shaped track assembly without changing its orientation with respect to the aircraft. In another configuration, the two halves of the U-shaped rail are made as mirror images of one another.

24 Claims, 12 Drawing Figures

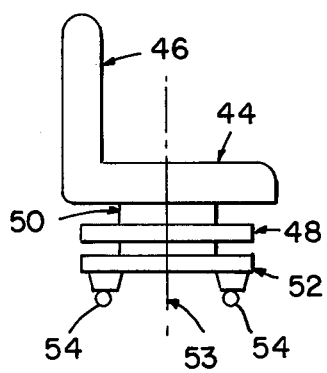
FIG. 4
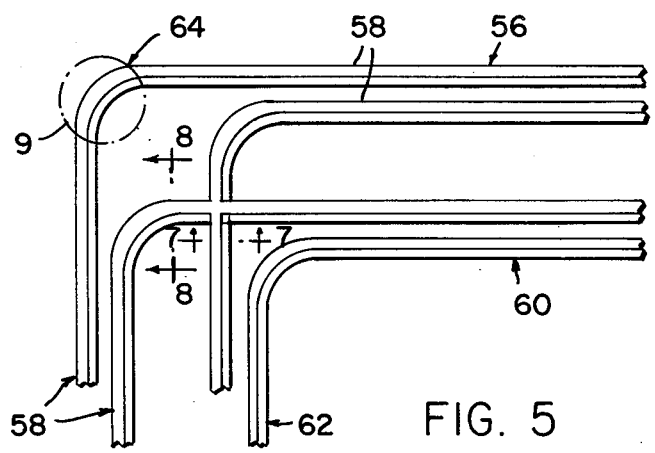
FIG. 5
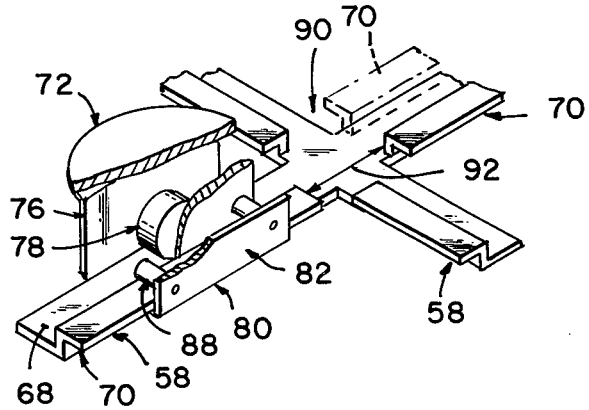
FIG. 6
FIG. 7
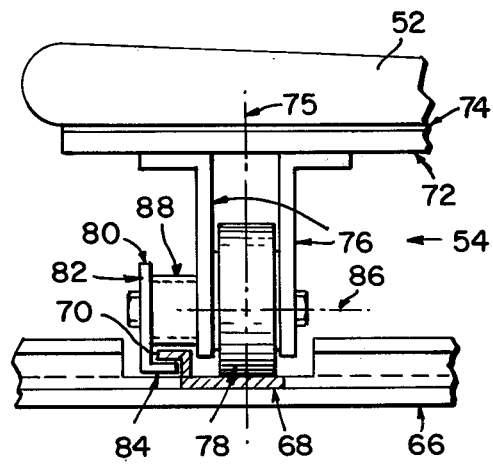
FIG. 8
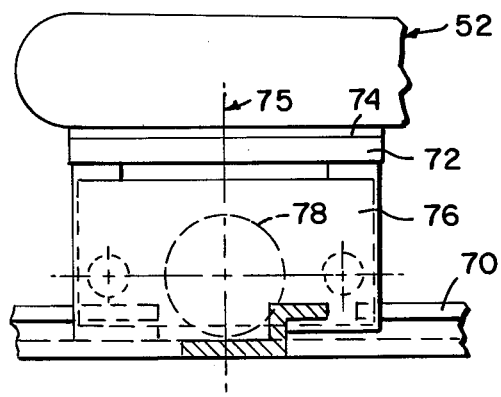
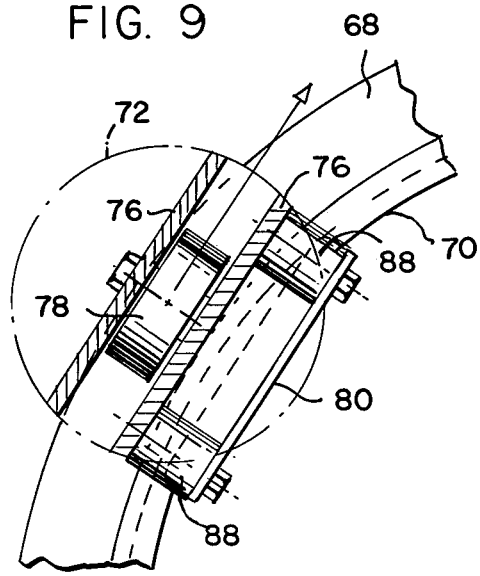
FIG. 9

SEAT TRACK MECHANISM FOR OPERATING STATION OF AIRCRAFT REFUELING BOOM

BACKGROUND OF THE INVENTION

1. Field of the Invention

The present invention relates to a seat and track assembly particularly adapted for mounting a seat in an operation station, such as an observer's seat in an operating station for an aircraft refueling boom.

2. Brief Description of the Prior Art

Since the present invention is particularly adapted for use in an operating station for an aircraft refueling boom, the prior art will be discussed with regard to that particular application. The usual method of aerial transfer of fuel from a tanker aircraft to a receiver aircraft involves the use of a refueling boom which is pivotally mounted to the lower rear end of the tanker aircraft. At the outer end of the boom there is an aerodynamic control apparatus (i.e. a ruddevator assembly) which is controlled by an operator positioned in the aircraft at a location proximate the interior end of the boom. The operator manipulates the ruddevator through appropriate controls to "fly" the boom into position for proper rendezvous with the receiver aircraft, so that the boom outlet can be properly positioned in that receptacle of the receiving aircraft. During refueling, there will be some relative movement between the two aircraft, so the operator continues to "fly" the boom during the refueling operation so that the boom follows the receiving aircraft without transmitting excessive lateral loads to the boom.

In operating stations which are now commonly used for refueling operations, the operator generally lies on his stomach facing rearwardly toward the boom, with his chin supported on a "doughnut-like cushion". However, this position is somewhat awkward and conducive to operator fatigue. Also, when a second person is positioned in the refueling boom operating station (e.g. in the situation where there is an observer or an instructor), the operation becomes particularly cumbersome. The second person must assume a prone position to one side or the other of the operator, and to obtain a view of both lateral extremes of the operating area of the boom, it is necessary for the second person to somehow move his head over the prone body of the operator.

Accordingly, there have been proposals in the prior art to modify the operating station so that the operator is in a sitting position. One such proposal is described in a U.S. patent application, entitled "Operating Station for Aircraft Refueling Boom", the inventor being Thomas H. White, this application being filed at or about the same time as the present application and being assigned to the same assignee of the present application. In that proposal, the operator's seat is located within the lower rear portion of the aircraft fuselage, with the seat positioning the operator in a moderately reclining sitting position facing rearwardly to view the operating area of the refueling boom. Two rearwardly and outwardly diverging leg well structures provide recesses to accommodate the operator's legs, and the viewing window is positioned between the operator's legs at approximately the position of the operator's knees.

There are also provided one or two observer's seats which are movably mounted in the operator's station so that the observer can be positioned on either side of the operator or in line with the operator so that he is looking directly over the operator's head toward the refueling area. Thus the observer's seat should be movable in a generally U-shaped pattern extending transversely along the back side of the operator's seat and longitudinally along each side of the operator's seat. Since the tanker aircraft may under some circumstances be subjected to negative "G" loads, it is also necessary that the observer's seat be securely mounted to the aircraft's structure. Further, since the observer will most all of the time be looking in the same general direction toward the operating area of the refueling boom, it is desirable that the base of the observer's seat maintain the same orientation with respect to the aircraft in spite of being moved along different directions of travel around the operator's seat.

With regard to the prior art appearing in the U.S. patents, the following are noted:

U.S. Pat. No. 307,850, Edwards, shows a bookkeeper's chair or stool mounted by four rollers to a pair of parallel transversely extending rails.

U.S. Pat. No. 1,167,932, Robertson, also shows a bookkeeper's stool mounted for lateral movement. In this patent the stool is mounted by a pair of upper rollers and a single lower roller to a pair of rails spaced one above the other.

U.S. Pat. No. 1,430,465, Niemuth, shows a swivel chair having four base rollers mounted to a pair of parallel tracks extending across the front of a desk.

U.S. Pat. No. 3,305,264, Gunn, shows an adjustable aircraft seat mounted by rollers to a pair of parallel forwardly and rearwardly extending rails.

U.S. Pat. No. 3,993,280, Surbaugh, shows a drafting stool mounted by rollers to parallel laterally extending rails.

SUMMARY OF THE INVENTION

The present invention is adapted for use in an operating station, such as an operating station to control a refueling boom of a tanker aircraft. More specifically, the present invention is particularly adapted for mounting an observer's seat in such an operating station, in a manner that the observer's seat can be moved in a U-shaped pattern around an operator's seat, while maintaining a substantially constant orientation with reference to the aircraft.

The seat track assembly of the present invention comprises a supporting structure, such as a supporting floor for an aircraft operating station, with this supporting structure having a longitudinal and a transverse axis. A track is mounted to the supporting structure, the track comprising at least three rail members, namely rail A, rail B, and rail C, with the track defining the line of travel, and with the line of travel having at least first and second travel line segments.

There is a base for a seat, the base being arranged for travel over said support structure along said line of travel. The base has "X" and "Y" axes of orientation, which axes of orientation have an angular relationship with the line of travel. The base has at least three tracking members, namely member A, member B, and member C, arranged in a predetermined base pattern relative to the axes of orientation, which tracking members track to, respectively, rail A, rail B and rail C. Each rail has a related rail axis along which its related tracking member travels.

The rails each have an instantaneous tracking point at which its related tracking member tracks at any one time, rail A having an instantaneous tracking point A, rail B having an instantaneous tracking point B, and rail C having an instantaneous tracking point C. The rails have a rail configuration arranged relative to the base pattern of the tracking members, with the first travel line segment of the track having a first angular relationship with the axes of orientation of the base at the first travel line segment, and the second travel line segment having a second different angular relationship with the axes of orientation of the second travel line segment. The rail configuration is characterized as follows:
1. The instantaneous tracking points A, B, and C at any one location along said first and second travel line segments are spaced from one another in a tracking pattern identical to the base pattern of the tracking members A, B, and C, respectively.
2. The tracking pattern as defined by the tracking points A, B, and C has "X" and "Y" axes which at said first travel line segment have the same angular relationship with the first travel line segment as does the base pattern at the first travel line segment, and at said second travel line segment have the same angular relationship as the base pattern with the second travel line segment.
3. Each of the rails has its rail axis parallel to a path of travel of its related tracking member at its instantaneous tracking points.

With this arrangement the base is able to travel over the track, while maintaining its axes of orientation in a predetermined alignment with respect to the supporting structure, regardless of angular variations between the line of travel and the axes of orientation of the base.

In the particular embodiment disclosed herein, the two travel line segments are at an angle with respect to one another less than 180°. The rails are arranged with their tracking pattern along the travel line segments in substantially the same alignment with the longitudinal and transverse axes of the supporting structure. Thus, as the base moves along the first and second travel line segments in a manner to change its direction of travel, the orientation of the base remains substantially constant with respect to the supporting structure.

To describe yet another relationship in the first preferred embodiment shown herein, each of these rails has its related first and second travel line segments in a substantially identical planform configuration. Each of the rails has a point of reference with respect to which its related first and second line segment portions can be located, with each point of reference being at substantially the same relative location with respect to its rail. The rails are spaced from one another so that the points of reference of each rail are spaced one from another in the same pattern as the base pattern, with the points of reference having a reference pattern with the same orientation with respect to the supporting structure as does the base pattern in moving over the first and second travel line segments of the track. Thus, as the base moves along the first and second travel line segments, the base maintains the same orientation with respect to the supporting structure, regardless of angular variations in its path of travel along said first and second travel line segments.

In the first preferred embodiment shown herein, the rails each have a substantially identical U-shaped planform configuration. Also in this preferred embodiment, there are four tracking members, each tracking to a related one of four rail members.

Each rail comprises a supporting portion and a retaining flange. Each tracking member comprises a swivel mounted roller arranged to rest on its related rail supporting portion, and also a retaining member arranged to engage the retaining flange of its related rail. Preferably, each retaining flange is positioned moderately above its related rail supporting portion, and each retaining member reaches laterally alongside of and beneath its related retaining flange. Thus, each tracking member is caused to track reliably to its related rail and is prevented from moving off its related rail.

At a location where two of the tracks intersect one another, each retaining flange is formed with a gap at such intersection. Each gap has a horizontal dimension at least as large as a width dimension of a related tracking member. Thus, each tracking member is able to move through the intersection without obstruction from the retaining flange. The retaining member of each tracking member has a lengthwise dimension greater than the horizontal dimension of the gap, so that the retaining member remains in constant retaining engagement with the retaining flange while the tracking member is moving through the intersection.

In a second preferred embodiment the track is U-shaped and the four rails are symmetrical about a center axis of the "U" configuration. In the second embodiment two observer seats are employed, one adaped to travel on one leg of the U, the other on the other leg of the U, and both seats able to travel along the transverse base of the U.

Other features of the present invention will become apparent from the following description.

BRIEF DESCRIPTION OF THE DRAWINGS

FIG. 4 is a side elevational view of an observer's seat, as seen at the location of line 4—4 of FIG. 3;

FIG. 5 is a plan view of one portion of the track mechanism of a first embodiment of the present invention;

FIG. 6 is an isometric view of a point of intersection of two of the rails shown in FIG. 5, with a tracking member about to move through the point of intersection;

FIG. 7 is a view taken along line 7—7 of FIG. 5 and showing a tracking member moving through the intersection;

FIG. 8 is a view of the tracking member shown in the location of FIG. 7, taken along lne 8—8 of FIG. 5;

FIG. 9 is a plan view of a tracking member moving through a curved portion of rail, this location being indicated by a circle indicated at 9 in FIG. 5;

DESCRIPTION OF THE PREFERRED EMBODIMENT

Since the present invention is particularly adapted for use in connection with a movable observer's seat in an operating station for an aircraft refueling boom, it will be described in that particular environment, with the understanding that the present invention could also be incorporated in other related applications.

Figure 1:
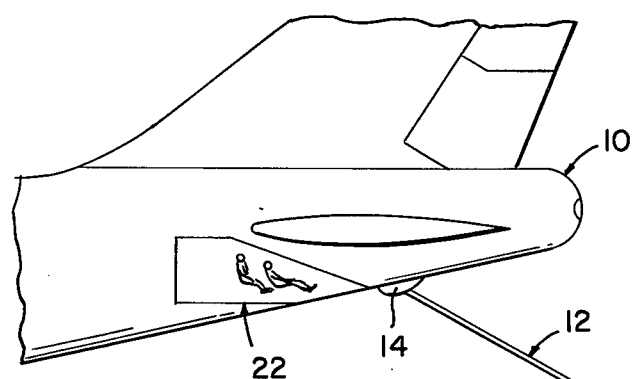
FIG. 1 is a side elevational view of a rear portion of a tanker aircraft having a refueling boom, said aircraft having an operating station for the refueling boom, incorporating the present invention.

In FIG. 1, there is shown a rear portion of an aircraft 10, having a refueling boom 12 gimble mounted to the lower rear end of the aircraft at 14, and having at its outer end a refueling probe 16 mounted telescopically within the boom 10. At the outer end of the probe 16, there is a nozzle 18 which upon extension of the probe 16 becomes positioned in an intake receptacle at the upper forward end of a receiver aircraft (not shown here for convenience of illustration). At the outer end of the boom 12, there is a ruddevator assembly 20 which is utilized to control movement of the boom 10 during a refueling operation.

Figure 2:
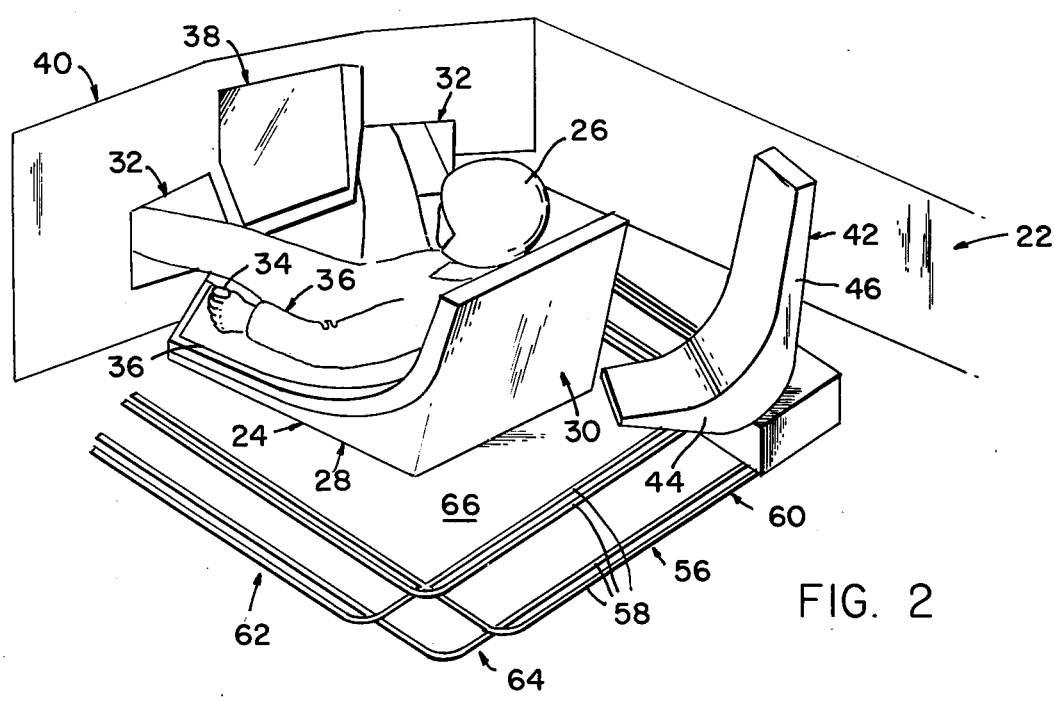
FIG. 2 is an isometric view of the operating station.
Figure 3:
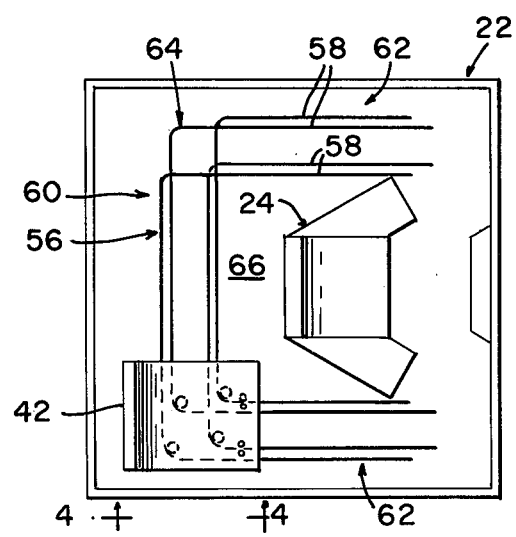
FIG. 3 is a top plan view of the operating station.

The operating station for the refueling boom is designated 22, and can best be seen with reference to FIGS. 2 and 3. This station 22 comprises an operator's seat 24 which places an operator 26 in a moderately reclining seated position, so that his vision is directed toward the refueling area of the boom 12. The seat 24 is made up of a seat platform 28 and a back 30. In describing the components of the operating station 22, the terms "forward" and "rearward" will be used not with reference to the overall structure of the aircraft fuselage, but rather with regard to the orientation of the operator 26 when positioned in the seat 24. Thus, the direction of the vision of the operator 26 toward the operating area of the boom 12 will be considered a "forward" direction, and the area adjacent the operator's back will be considered "rearward". The longitudinal axis shall be considered coincident with the lengthwise axis of the airplane fuselage, and the transverse axis will be considered coincident with an axis extending horizontally across the aircraft fuselage.

The operating station 22 further comprises a pair of leg well structures 32, which extend forwardly and divergently from the operator's seat 24 to receive the legs of the operator 26. A pair of operating handles 34 are positioned on arm rests 36 positioned on opposite sides of the seat 24. Positioned between the leg well structures 32 at about the knee location of the operator 26 is a window 38 by which the operator 26 obtains a direct view of the operating area of the refueling boom 12. An instrument panel 40 extends laterally from both sides of the window 38.

In those conditions where a second and possibly a third person are also to be positioned in the operating station 22 (e.g. an observer and/or an instructor), one or two additional seats are provided. One such seat is shown at 42 in FIG. 2. In the following description of the first embodiment, this seat 42 will be called an "observer's seat 42." Only one observer's seat 42 is shown, but it should be understood that a pair of observer's seat could be installed in the operating station 22.

Each observer's seat 42 has a conventional seating platform 44 and back rest 46, with the platform 44 being mounted to an intermediate support plate 48 by means of a suitable mounting device 50. This mounting device 50 is or may be of conventional design and permits the seat 42 to be moved a short distance (e.g. eight inches or so) along a horizontal straight line relative to the intermediate support plate 44. Since such devices are well known in the prior art, the particular mounting device 50 will not be described in detail herein. The intermediate support plate 48 is mounted for rotation about a vertical axis 53 to a support base 52, which in turn rests upon four swivel mounted roller devices 54.

There is a track 56 to which the observer's seat 42 is mounted by means of its support base 52 and roller devices 54. The arrangement of this track 56 with respect to the roller devices 54 and base 52 is of particular significane in the present invention and will thus be described in detail herein. The track 56 comprises four rails 58 each of which has a related roller device 54 tracking thereto. As viewed from above, the track 56 has a generally U-shaped configuration, and thus has a transversely extending rear portion 60 positioned immediately behind the operator's seat 24, two side portions 62 extending on opposite sides of the operator's seat 24, and two curved transitional portions 64 connecting the side portions 62 to the rear portion 60. Each rail 58 is mounted to a supporting floor 66 of the operating station 22, and comprises a lower supporting portion 68 on which a related roller device 54 rides, and a laterally extending retaining flange 70 extending substantially the entire length of its related rail 58, and raised moderately with respect to the rail supporting portion 68.

Each roller device 54 comprises a pivot plate 72 mounted to the base 52 through a suitable bearing 74 for free rotation about a vertical axis 75. Fixedly connected to the lower part of the pivot plate are a pair of mounting plates 76 spaced from one another to receive therebetween a related roller element 78.

A retaining guide 80 is fixedly connected to one of the mounting plates 76 in a manner to engage the retaining flange 70 of its related rail 58. As shown herein, this retaining guide 80 is in the form of an angle iron having an upper vertically aligned web portion 82 positioned laterally adjacent the retaining flange 70 and a lower horizontal web portion 84 which reaches beneath its related retaining flange 70. The upper web portion 82 is rigidly connected to the mounting plate 76 through a pair of pins, each of which has a surrounding spacing sleeve 88. Thus, the retaining guide 80 reaches around the outside edge and beneath the retaining flange 70 of the rail 58 to serve the dual function of causing its related roller element 78 to properly track to its related rail 58, and also to prevent upward movement off the rail 58 under circumstances of negative "G" loading.

At such locations at which a pair of rails 58 intersect one another (such an intersection shown at 90 in FIG. 6), a section of each retaining flange 70 is removed, as at 92. The lengthwise dimension of this removed section 92 is slightly greater than the overall width dimension of the roller device 54, to permit the free movement of a roller device 54 through the intersection 90 along either rail 58. The lengthwise dimension of each retaining guide 80 is made moderately greater than that of the removed flange section 92, so that as a roller device 54 moves through the intersection 90, the retaining guide 80 always remains in proper engagement with its retaining flange 70. (See FIG. 7.)

Also, there is sufficient spacing between the retaining guide 80 and the outside edge of the retaining flange 70 so that when the roller device 54 is moving along a curved section of rail 58 (as shown in FIG. 9), the roller device 54 will be able to continue to move freely along the rail 58. As a possible modification, each rail 58 can be made with two retaining flanges 70, so that it could be engaged by two retaining guides 80 on opposite sides of its related roller device 54. The arrangement of such a second retaining flange 70 is indicated in broken lines in FIG. 6.

As indicated earlier herein, the arrangement of the base 52 with its four roller devices 54 relative to the four rails 58 of the track 56 is particularly critical in the present invention. To explain this more fully, reference is now made to FIG. 10, where a portion of the four rails 58 and the four roller devices 54 are indicated semi-schematically in a plan view. The four roller devices 54 are designated 54a, 54b, 54c, and 54d, and the four rails to which these roller devices track have corresponding designations 58a, 58b, 58c, and 58d, respectively. While four rails 58a-d are shown in this embodiment, it is to be understood that the number of rails could be decreased to three rails and still provide three point support, or the number of rails could be increased for yet additional support.

Figure 10:
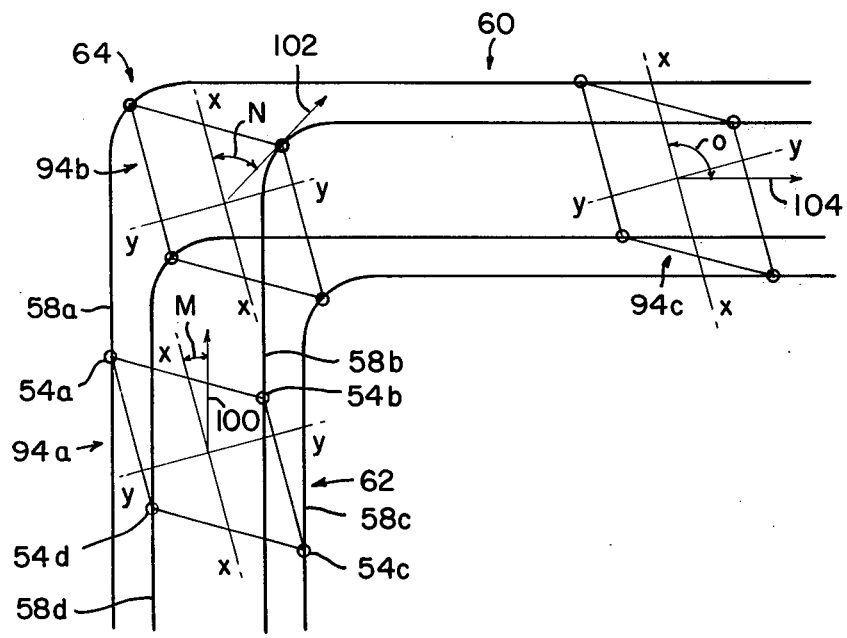
FIG. 10 is a semi-schematic view of the track section shown in FIG. 5, to illustrate the orientation and paths of travel of tracking members moving along the track.

In FIG. 10, the four roller devices 54a-d are shown at a location on a side track portion 62, with these roller devices 54a-d being indicated schematically as small circles. It can be seen that the four roller devices 54a-d are arranged in the configuration of an oblique parallelogram, which can be considered as the "base pattern" of the four roller devices 54 a-d, this pattern being indicated at 94. For purposes of analyses, the base pattern 94 is considered as having "X" and "Y" horizontal axes of orientation, with the "X" axis being parallel to the generally longitudinally extending sides 52a of the parallelogram base 94, and the "Y" axis being perpendicular to the "X" axis.

In FIG. 10, the four roller devices 54a-d are shown in a first location on the track side portion 62, in a second location moving through the track curved section 64, and in a third location moving along the track back portion 60, these three locations being indicated at 94a, 94b and 94c, respectively. At location 94a, the four roller devices 54a-d are moving rearwardly as indicated by arrow 100. The angle at which the axis of orientation "X" makes with the direction of travel 100 is indicated at angle "M". As the roller devices 54a-d move to their second position 94b illustrated in FIG. 10, it can be seen that the axes of orientation "X" and "Y" have not shifted angularly, but that the direction of travel 102 of the base 52 has changed so that it now makes a larger angle "N" with the axis "X". When the roller devices 54a-d have reached their third position 94c, the axes of orientation "X" and "Y" remain in the same alignment as in the previous two positions, but the direction of travel 104 now makes a yet larger angle "O" with the axis "X".

To analyze now the configuration of the rails 58 relative to the pattern of the roller devices 54, as indicated previously the relative location of the four roller devices 54a-d is considered as establishing a "base pattern" having four points corresponding to the tracking locations of the four roller devices 54a-d. The four rails 58a-d can be considered as having four "instantaneous tracking points", which points are the location at which the four roller devices 54a-d track to the rails 58a-d at any particular instant. Thus, the four instantaneous tracking points define a "tracking pattern" which is necessarily identical to the base pattern 94 of the four wheel devices 54a-d. Thus, the three representations 94a, 94b and 94c of the base pattern in FIG. 10 are also representations of the tracking pattern.

Thus it can be concluded that the spacing and configuration of the four rails 58a-d at any location along the lengths thereof is determined by the tracking pattern, in a manner that the following requirements are met:

1. At any location along the track 56, the tracking pattern should be identical with the base pattern 94.
2. The "X" and "Y" axes of the tracking pattern should have the same angular relationship with the line of travel over the track 56 at any location as do the axes of orientation of the base pattern 94 at that same location.
3. Each rail 58 should have its rail axis (i.e. the instantaneous direction of travel along the rail at any point) parallel to the path of travel of its related roller device at that point.

Figure 11:
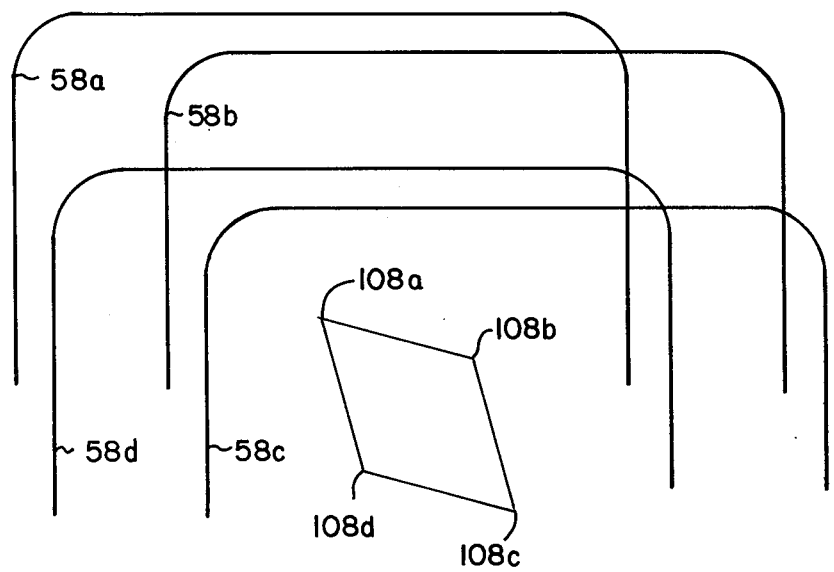
FIG. 11 is a semi-schematic plan view of the track mechanism of the first embodiment; illustrating the relative spacing of the four rail members which make up the track.

Reference is now made to FIG. 11 to analyze yet another facet of the present invention. As indicated earlier herein, one of the features of this particular embodiment of the present invention is that the observer's seat 42 can be moved in different directions along the track 56, with the angle of orientation of the seat base 52 remaining substantially constant. The particular advantage of this is that when the observer's seat 42 is being moved around one of the curved track portions 64, the underlying base 52 does not rotate relative to the orientation of the structure of the airplane 10. This alleviates any necessity of the observer or instructor having to put forth the effort to rotate his seat 42 relative to the base 52 to maintain the same orientation with the airplane 10 every time the seat 42 is moved from one section of track 56 to the other.

As shown in FIG. 11, it can be seen that the planform configuration of each of the rails 58a-d is substantially identical. For purposes of analysis, each of the rails 58a-d can be considered as having a point of reference from which the location of each portion of that rail can be identified. For these U-shaped rails 58, a convenient reference point is one which is equally distant from the three straight line sections of that rail 58. With the relative location of the four points of reference being the same for each rail 58, the arrangement of these points is shown in FIG. 11, and the points are designated 108a, 108b, 108c, and 108d to correspond to related rails 58a-d, respectively. It can be seen that the four points of reference 108a-d are in a pattern identical to the base pattern of the four roller devices 54a-d and therefore also identical to the instantaneous tracking pattern.

To summarize the overall operation of this first embodiment of the seat and track assembly of the present invention, one or more observer's seats 42 are mounted to the track 56 by means of their roller devices 54 in the manner described above. Each roller device 54 moves freely along its related track 58, with its retaining guide 80 being constantly in a retaining position relative to its rail retaining flange 70. At the locations of rail intersections 90, each roller device is free to move through the intersection 90 without encountering any obstructions, and with the retaining guide always remaining in engagement with its related flange 70.

As the observer (or instructor) positioned in the seat 42 moves from one track portion to the other (e.g. from the back track portion 60 around the curved track portion 64 and down along the track side portion 62), there is no rotation of the seat base 52 relative to the structure of the airplane 10, and consequently there is no tendency for the seat 42 itself to be turned away from the operating area of the boom 12. The seat 42 changes its orientation with respect to the aircraft structure only when the observer or instructor makes deliberate efforts to rotate the seat 42 relative to the base 52 about its axis of rotation 53. Thus, as shown in FIG. 2, the one observer seat 42 has been moved to a location on the track curved portion 64, then rotated 45°, and then moved linearly by means of the mounting device 50 to assume a position adjacent and to one side of the operator's seat 30 for a closer view through the window 38.

Figure 12:
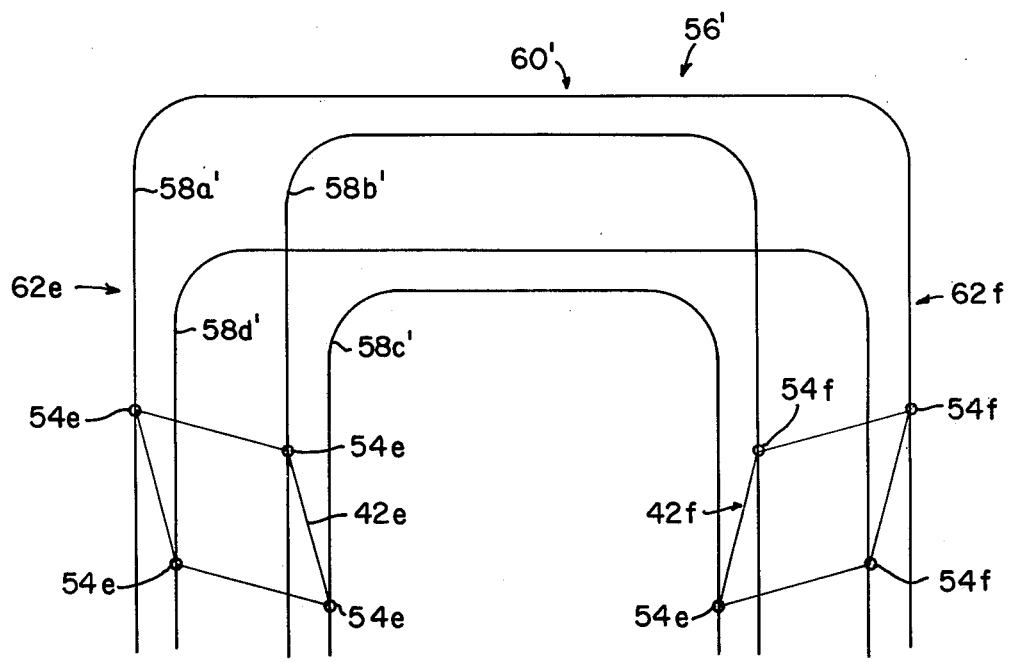
FIG. 12 is a semi-schematic plan view of the track mechanism of a second embodiment of the present invention.

A second embodiment of the present invention is illustrated semi-schematically in FIG. 12. The track 56' has a U shaped configuration with four rails 58a' 58b', 58c' and 58d'. However, instead of the four rails 58a'-58d' being identical, the track 56' is made symmetrical about the center axis of the "U" configuration. Two observer seats 42' are provided, with the base pattern of the roller devices 54e of seat 42e being arranged to travel over one track side portion 62e, and the rear track portion 60'. The base pattern of the roller devices 54f of the other seat 42f is a mirror image of the base pattern of the roller devices 54e for travel over the other track side portion 62f and for travel also over the rear track portion 60'. Thus the two halves of the U shaped track 56' can be considered as being identical to each other, except that one is a mirror image of the other. This system required the use of the two seats 42e and 42f, which are able to use the back rear portion 60' in common.

What is claimed is:

1. In an operating station, such as an operating station to control a refueling boom of a tanker aircraft, a track and seat assembly by which a seat is able to move along its track, while maintaining a predetermined orientation with respect to said aircraft, said track and seat assembly comprising:
   a. a supporting structure, such as a supporting floor for an aircraft operating station, said supporting structue having a longitudinal axis and a transverse axis,
   b. a track mounted to said supporting structure, said track comprising at least three rail members, namely rail A, rail B and rail C, said track defining a line of travel, said line of travel having at least first and second travel line segments,
   c. a base for a seat, such as a seat at said operating station, said base being arranged for travel over said support structure along said line of travel, said base having "X" and "Y" axes of orientation, which axes of orientation have an angular relationship with said line of travel,
   d. said base having at least three tracking members, namely member A, member B and member C, arranged in a predetermined base pattern relative to the axes of orientation, which tracking members track to, respectively, rail A, rail B and rail C,
   e. each rail having a related rail axis along which its related tracking member travels,
   f. said rails each having an instantaneous tracking point at which its related tracking member tracks at any one time, said rail A having an instaneous tracking point A, said rail B having an instantaneous tracking point B, and said rail C having an instantaneous tracking point C,
   g. said rails having a rail configuration arranged relative to the base pattern of the tracking members, with the first travel line segment of the track having a first angular relationship with the axes of orientation of the base at the first travel line segment, and the second travel line segment having a second different angular relationship with the axes of orientation of the base, said rail configuration being characterized as follows:
   (1) said instantaneous tracking points A, B and C at any one location along said first and second travel line segments are spaced from one another in a tracking pattern identical to the base pattern of the tracking members A, B and C, respectively,
   (2) said tracking pattern, as defined by tracking points A, B and C, has "X" and "Y" axes which at said first travel line segment have the same angular relationship with the first travel line segment as does the base pattern at the first travel line segment, and at said second travel line segment have the same angular relationship as the base pattern with said second travel line segment,
   (3) each of said rails has its rail axis parallel to a path of travel of its related tracking member at its instantaneous tracking points,
   whereby said base is able to travel over said track, while maintaining its axes of orientation in a predetermined alignment with respect to said supporting structure, regardless of angular variations between said line of travel and the axes of orientation of the base.

2. The track and seat assembly as recited in claim 1, wherein said two travel line segments are at an angle with respect to one another less than 180°, and said rails are arranged with their tracking pattern along said two travel line segments in substantially the same alignment with regard to the longitudinal and transverse axes of said supporting structure, whereby as said base moves along said first and second travel line segments in a manner to change its direction of travel, the orientation of the base remains substantially constant with respect to the supporting structure.

3. The track and seat assembly as recited in claim 1, wherein said first and second travel line segments are positioned relative to one another at an angle less than 180°, each of said rails having its related first and second travel line segments in a substantially identical planform configuration, each of said rails having a point of reference with respect to which its related first and second line segment portions can be located, each point of reference being in substantially the same relative location with respect to its rail, said rails being spaced from one another so that the points of reference of each rail are spaced one to another in the same pattern as said base pattern, with the points of reference having a reference pattern having the same orientation with respect to the supporting structure as does the base pattern in moving over said first and second travel line segments of the track, whereby as said base moves along said first and second travel line segments, the base maintains same orientation with respect to the supporting structure, regardless of angular variations in its path of travel along said first and second travel line segments.

4. The track and seat assembly as recited in claim 1, wherein the rails each have substantially identical U-shaped planform configurations, with each U-shaped configuration having a related reference point with respect to which portions of the related U-shaped rail can be located, each of said reference points being at the same relative location with respect to its related rail, said reference points being arranged in a pattern substantially identical to the base pattern, and ha.ing the same orientation as the base pattern with rect to the supporting structure, whereby said base is able to move over said U-shaped track, and yet maintain its same orientation with respect to the supporting structure, while its line of travel changes during movement over said U-shaped track.

5. The track and seat assembly as recited in claim 4, wherein said base has four tracking members, and there are four U-shaped rails each having a related tracking member tracking thereto, with each of said U-shaped rails having substantially the same orientation with respect to said supporting structure, and being spaced from one another in a pattern substantially identical to the base pattern of the four tracking members.

6. The track and seat assembly as recited in claim 1, wherein each of said rails comprises a supporting portion and a retaining flange, and each of the related tracking members comprises a swivel mounted roller arranged to rest on its related rail supporting portion, and also comprises a retaining member arranged to engage its related retaining flange.

7. The track and seat assembly as recited in claim 6, wherein each of said retaining flanges is positioned moderately above its related rail supporting portion, and each of said retaining members reaches laterally alongside said retaining flange and beneath said retaining flange, whereby each of said tracking members is caused to track reliably to its related rail and is prevented from moving up from its related rail.

8. The track and seat assembly as recited in claim 7, wherein at least two of said tracks intersect each other at a point of intersection, each retaining flange having a gap at said intersection, each gap having a horizontal dimension at least as large as a width dimension of said tracking members, whereby said tracking member is able to move through said intersection without obstruction from said retaining flange, the retaining member of each tracking member having a lengthwise dimension greater than the horizontal dimension of said gap, whereby said retaining member remains in constant retaining engagement with said retaining flange while said tracking member is moving through said intersection.

9. The track and seat assembly as recited in claim 6, wherein at least two of said tracks intersect each other at a point of intersection, each retaining flange having a gap at said intersection, each gap having a horizontal dimension at least as large as a width dimension of said tracking members, whereby said tracking member is shaped track, and yet maintain its same orientation with respect to the supporting structure, while its line of travel changes during movement over said U-shaped track, b. each of said rails comprises a supporting portion and a retaining flange, and each of the related tracking members comprises a swivel mounted roller arranged to rest on its related rail supporting portion, and also comprises a retaining member arranged to engage its related retaining flange, c. each of said retaining flanges is positioned moderately above its related rail supporting position, and each of said retaining members reaches laterally alongside said retaining flange and beneath said retaining flange, whereby each of said tracking members is caused to track reliably to its related rail and is prevented from moving up from its related rail, d. at least two of said tracks intersect each other at a point of intersection, each retaining flange having a gap at said intersection, each gap having a horizontal dimension at least as large as a width dimension of said tracking members, whereby said tracking member is able to move through said intersection without obstruction from said retaining flange, the retaining member of each tracking member having a lengthwise dimension greater than the horizontal dimension of said gap, whereby said retaining member remains in constant retaining engagement with said retaining flange while said tracking member is moving through said intersection.

11. In an operating station to control a refueling boom of a tanker aircraft where there is an operator and at least one observer, a track and seat assembly by which an observer seat is able to move along its track around an operator location, while maintaining a predetermined orientation with respect to said aircraft, said track and seat assembly comprising:

a. a supporting structure for an aircraft operating station, said supporting structure having a longitudinal axis and a transverse axis, b. a U-shaped track mounted to said supporting structure, said track comprising at least three rail members, namely rail A, rail B and rail C, said track defining a line of travel, said line of travel having at least first and second travel line segments, c. a base for said observer seat, such as a seat at said point with respect to which portions of the related U-shaped rail can be located, each of said reference points being at the same relative location with respect to its related rail, said reference points being arranged in a pattern substnatially identical to the base pattern, and having the same orientation as the base pattern with respect to the supporting structure, whereby said base is able to move over said U-shaped track, and yet maintain its same orientation with respect to the supporting structure, while its line of travel changes during movement over said U-shaped track.

12. The track and seat assembly as recited in claim 11, wherein said base has four tracking members, and there are four U-shaped rails each having a related tracking member tracking thereto, with each of said U-shaped rails having substantially the same orientation with respect to said supporting structure, and being spaced from one another in a pattern substantially identical to the base pattern of the four tracking members.

13. The track and seat assembly as recited in claim 11, wherein each of said rails comprises a supporting portion and a retaining flange, and each of the related tracking members comprises a swivel mounted roller arranged to rest on its related rail supporting portion, and also comprises a retaining member arranged to engage its related retaining flange.

14. The track and seat assembly as recited in claim 13, wherein each of said retaining flanges is positioned moderately above its related rail supporting portion, and each of said retaining members reaches laterally alongside said retaining flange and beneath said retaining flange, whereby each of said tracking members is caused to track reliably to its related rail and is prevented from moving up from its related rail.

15. The track and seat assembly as recited in claim 14, wherein at least two of said tracks intersect each other at a point of intersection, each retaining flange having a gap at said intersection, each gap having a horizontal dimension at least as large as a width dimension of said tracking members, whereby said tracking member is able to move through said intersection without obstruction from said retaining flange, the retaining member of each tracking member having a lengthwise dimension greater than the horizontal dimension of said gap, whereby said retaining member remains in constant retaining engagement with said retaining flange while said tracking member is moving through said intersection.

16. The track and seat assembly as recited in claim 13, wherein at least two of said tracks intersect each other at a point of intersection, each retaining flange having a gap at said intersection, each gap having a horizontal dimension at least as large as a width dimension of said tracking members, whereby said tracking member is able to move through said intersection without obstruction from said retaining flange, the retaining member of each tracking member having a lengthwise dimension greater than the horizontal dimension of said gap, whereby said retaining member remains in constant retaining engagement with said retaining flange while said tracking member is moving through said intersection.

17. The track and seat assembly as recited in claim 11, wherein;
 a. each of said rails comprises a supporting portion and a retaining flange, and each of the related tracking members comprises a swivel mounted roller arranged to rest on its related rail supporting portion, and also comprises a retaining member arranged to engage its related retaining flange,
 b. each of said retaining flanges is positioned moderately above its related rail supporting portion, and each of said retaining members reaches laterally alongside said retaining flange and beneath said retaining flange, whereby each of said tracking members is caused to track reliably to its related rail and is prevented from moving up from its related rail,
 c. at least two of said tracks intersect each other at a point of intersection, each retaining flange having a gap at said intersection, each gap having a horizontal dimension at least as large as a width dimension of said tracking members, whereby said tracking member is able to move through said intersection without obstruction from said retaining flange, the retaining member of each tracking member having a lengthwise dimension greater than the horizontal dimension of said gap, whereby said retaining member remains in constant retaining engagement with said retaining flange while said tracking member is moving through said intersection.

18. In an operating station to control a refueling boom of a tanker aircraft where there is an operator and at least one observer, a track and seat assembly by which two observer seats are able to move along said track around an operator location, while maintaining a predetermined orientation with respect to said aircraft, said track and seat assembly comprising:
 a. a supporting structure for an aircraft operating station, said supporting structure having a longitudinal axis and a transverse axis,
 b. a U-shaped track mounted to said supporting structure, said track comprising at least three rail members, namely rail A, rail B and rail C, said track defining a line of travel, said line of travel having at least first and second travel line segments,
 c. a pair of bases, one for each of said observer seats, each base being arranged for travel over said support structure along said line of travel, each base having "X" and "Y" axes of orientation, which axes of orientation have an angular relationship with said line of travel,
 d. each base having at least three tracking members, namely member A, member B and member C, arranged in a predetermined base pattern relative to its axes of orientation, which tracking members track to, respectively, rail A, rail B and rail C,
 e. each rail having a related rail axis along which its related tracking members travel,
 f. said rails each having an instantaneous tracking point at which a related tracking member tracks at any one time, said rail A having an instantaneous tracking point A, said rail B having an instantaneous tracking point B, and said rail C having an instantaneous tracking point C,
 g. said track having a substantially symmetrical planform configuration with respects to a center axis of said track, said track having a transverse portion and two side portions, one of said bases being arranged for travel over one track side portion and the track transverse portion, and the other of said bases being arranged for travel over the other track side portion and said track transverse portion, the tracking pattern of said one track side portion being aligned with and substantially identical with the base pattern of the first base, the tracking pattern of the other track side portion being aligned with and substantially identical with the base pattern of the other base, and said track transverse portion having tracking patterns aligned with and identical to the base patterns of both of said bases, whereby each base is able to travel over its related track side portion, and both bases are able to travel in common over said track transverse portion.

19. The track and seat assembly as recite in claim 18, wherein said base has four tracking members, and there are four U-shaped rails each having a related tracking members tracking thereto, with each of said U-shaped rails having substantially the same orientation with respect to said supporting structure, and being arranged symmetrically about a center axis of said U-shaped track.

20. The track and seat assembly as recited in claim 18 wherein each of said rails comprises a supporting portion and a retaining flange, and each of the related tracking members comprises a swivel mounted roller arranged to rest on its related rail supporting portion, and also comprises a retaining member arranged to engage its related retaining flange.

21. The track and seat assembly as recited in claim 20, wherein each of said retaining flanges is positioned moderately above its related rail supporting portion, and each of said retaining members reaches laterally alongside said retaining flange and beneath said retaining flange, whereby each of said tracking members is caused to track reliably to its related rail and is prevented from moving up from its related rail.

22. The track and seat assembly as recited in claim 21, wherein at least two of said tracks intersect each other at a point of intersection, each retaining flange having a gap at said intersection, each gap having a horizontal dimension at least as large as a width dimension of said tracking members, whereby said tracking member is able to move through said intersection without obstruction from said retaining flange, the retaining member of each tracking member having a lengthwise dimension greater than the horizontal dimension of said gap, whereby said retaining member remains in constant retaining engagement with said retaining flange while said tracking member is moving through said intersection.

23. The track and seat assembly as recited in claim 20 wherein at least two of said tracks intersect each other at a point of intersection, each retaining flange having a gap at said intersection, each gap having a horizontal dimension at least as large as a width dimension of said tracking members, whereby said tracking member is able to move through said intersection without obstruction from said retaining flange, the retaining member of each tracking member having a lengthwise dimension greater than the horizontal dimension of said gap, whereby said retaining member remains in constant retaining engagement with said retaining flange while said tracking member is moving through said intersection.

24. The track and seat assembly as recited in claim 18, wherein;
 a. each of said rails comprises a supporting portion and a retaining flange, and each of the related tracking members comprises a swivel mounted roller arranged to rest on its related rail supporting portion, and also comprises a retaining member arranged to engage its related retaining flange,
 b. each of said retaining flanges is positioned moderately above its related rail supporting portion, and each of said retaining members reaches laterally alongside said retaining flange and beneath said retaining flange, whereby each of said tracking members is caused to track reliably to its related rail and is prevented from moving up from its related rail,
 c. at least two of said tracks intersect each other at a point of intersection, each retaining flange having a gap at said intersection, each gap having a horizontal dimension at least as large as a width dimension of said tracking members, whereby said tracking member is able to move through said intersection without obstruction from said retaining flange, the retaining member of each tracking member having a lengthwise dimension greater than the horizontal dimension of said gap, whereby said retaining member remains in constant retaining engagement with said retaining flange while said tracking member is moving through said intersection.

* * * * *